United States Patent
Kawamura

Patent Number: 5,881,990
Date of Patent: Mar. 16, 1999

[54] VIBRATION AND SOUND ISOLATION DEVICE FOR A COGENERATION SYSTEM WITH AN ENGINE

[75] Inventor: Hideo Kawamura, Kanagawa-ken, Japan

[73] Assignee: Isuzu Ceramics Research Institute Co., Ltd., Kanagawa-ken, Japan

[21] Appl. No.: 893,577

[22] Filed: Jul. 11, 1997

[30] Foreign Application Priority Data

Jul. 17, 1996 [JP] Japan .................................. 8-205456
Jul. 17, 1996 [JP] Japan .................................. 8-205457

[51] Int. Cl.$^6$ ........................................ F16M 1/00
[52] U.S. Cl. ..................... 248/638; 248/637; 248/633; 248/678; 280/30
[58] Field of Search .................. 348/638, 631, 348/633, 632, 678; 280/30; 62/323.1, 238.6; 296/182, 204

[56] References Cited

U.S. PATENT DOCUMENTS 3,778,177 12/1973 Haker et al. .
4,127,300 11/1978 Melley et al. .
4,517,799 5/1985 Hanaoka et al. .

FOREIGN PATENT DOCUMENTS 0320415 6/1989 European Pat. Off. .
62-128150 8/1987 Japan .
1-166248 11/1989 Japan .
2-004939 1/1990 Japan .
2-114753 9/1990 Japan .

*Primary Examiner*—Ramon O. Ramirez
*Assistant Examiner*—Long Dinll Phan
*Attorney, Agent, or Firm*—Browdy and Neimark

[57] ABSTRACT

In the vibration isolation device for a cogeneration system with an engine, to suppress vibrations and noise from the engine, the mounting table on which the engine and the generator are mounted is installed through the main tires and the subtires on the base laid at the installation site. The support members arranged on the base are made to contact the main tires and the subtires and are secured to the base. Further, the sound isolation device for a cogeneration system has a truck—comprising the mounting table and the tires—mounted on the base placed in the installation chamber at the installation site. The installation chamber is formed by multilayer wall bodies. The multilayer wall bodies each comprise a hollow metal housing, a rubber covering layer secured to the inner surface of the metal housing, and a corrugated support member incorporated in the metal housing. The multilayer wall bodies have their hollow portions evacuated.

13 Claims, 2 Drawing Sheets

VIBRATION AND SOUND ISOLATION DEVICE FOR A COGENERATION SYSTEM WITH AN ENGINE

BACKGROUND OF THE INVENTION

1. Field of the Invention

The present invention relates to a vibration and sound isolation device (a vibration isolating and noise insulating device) for a cogeneration system with an engine, which prevents dissipation of vibrations and noise generated by the engine of the cogeneration system of a power (an electric power) generation system using heavy oil and others as fuels.

2. Description of the Prior Art

Fuels commonly used for engines include gasoline, light oil and heavy oil. Cogeneration systems employ a diesel engine operating on light oil as a fuel and often has a generator connected to the engine. If a low-quality fuel such as heavy oil can be used in the cogeneration systems, the fuel cost can be lowered and the fuel cost problem cleared. The cogeneration systems, however, have to deal with problems of environmental pollution, such as emission of exhaust gas, noise and vibrations, because they are often located in urban areas and fixedly installed at predetermined sites.

Japanese Utility Model Laid-Open No. 128150/1987 discloses an engine-driven heat storage apparatus equipped with a vibration isolation device. This engine-driven heat storage apparatus has an engine immersed in a heat medium such as water contained in a heat storage tank to store the waste heat of the engine in the heat medium. The engine is supported through a vibration isolation device on a support frame which is separate from the heat storage tank and made from a wire structural material.

Another waste heat utilization apparatus as a heat generating device with sound isolation is disclosed in Japanese Utility Model Laid-Open No. 4939/1990. This waste heat utilization apparatus has, for example, a construction in which a heat generating device such as an engine-driven generator that produces noise and heat during operation is installed in a housing to prevent dissipation of noise of the heat generating device and in which the waste heat of the heat generating device is used for heating water. In this waste heat utilization apparatus, the housing has a hermetically closed structure with its legs supporting the housing on the floor.

Further, Japanese Utility Model Laid-Open No. 166248/1989 discloses a sound isolation type water-cooled engine. The sound isolation type water-cooled engine has its engine body and muffler immersed in a sound isolation liquid filled in a sound isolation liquid tank and also has an air cleaner immersed in the sound isolation liquid with both its element replacement opening and air intake port exposed outside from the tank and with fins attached to the outer wall surface of a cleaner case.

Another vibration isolation structure for the cogeneration equipment is presented in Japanese Utility Model Laid-Open No. 114753/1990. This vibration isolation structure concerns a cogeneration equipment installation structure that integrates an engine and a generator as one system. In this structure, the engine body is immersed in water sealed in an enclosed case with the generator installed outside the enclosed case, and the engine and the generator are supported by a support means with a low spring constant, thereby suppressing vibrations transmitted from the engine to the outside.

The engines for cogeneration system and power supply system are fixedly installed and thus pose a serious problem of emission of noise, vibrations and exhaust gases from the engine. A possible measure of preventing emission of noise and vibrations from the cogeneration system may include installing the cogeneration system underground. This, however, is costly and has difficulty finding appropriate locations. Installing underground is therefore difficult in practice.

Vibrations and noise generated by engines present serious problems. When a large engine is mounted to a structure, its vibrations are transmitted to the whole structure, generating noise at locations where structure's frequency coincides with the frequency of the transmitted vibrations. Prevention of vibrations and noise is therefore very difficult. A common method of preventing vibrations and noise is to mount on a structure a base that comprises a rubber sheet put on the structure and a iron plate mounted on the rubber sheet, and to install the cogeneration system on the base.

The above noise and vibration prevention method, however, has a drawback that if the modulus of elasticity of the rubber is set small to absorb vibrations, the rubber will collapse too easily and if it is set large, not only will the rubber fail to absorb vibrations but also the engine may be dislocated, though over a small distance, by vibrations of the engine itself. When the engine is to be installed at a particular location in a building, as with an engine-driven power supply system, it is very difficult to suspend the engine and other equipment of the power supply system and install them on the base, which comprises a rubber and an iron plate on the rubber. Furthermore, installing the power supply system in a sound isolation case is equally difficult and costly, and thus impractical.

The problem of the fixed-location type engine in a cogeneration system is the magnitude of vibration-induced noise, which can hardly be reduced by ordinary noise insulating means. Vibration isolation effects may be produced by inserting an elastic member such as a rubber sheet between solid bodies. The rubber sheet, however, has a problem that if its modulus of elasticity is set large, the rubber will deform too easily and that if it is set small, noise will be transmitted. Hence, the sound isolation effect cannot be expected of the rubber sheet. The noise in the cogeneration system is produced as follows. Vibrations produced by the engine are transmitted to the structure at whose resonating points the vibrations are amplified to produce a resonating sound. Radiating sound generated by the engine is transformed into air vibrations that in turn cause resonance of solid bodies. Removing the radiating noise of the engine can be accomplished by arranging a vacuum chamber or an air chamber with small density in the noise radiation route.

As described above, when the engine of the power supply system is enclosed in a narrow space, sound waves, the cause of noise, are reflected by wall surfaces and the reflected sound waves are amplified by resonance, giving rise to a possibility of complex vibrations being generated. Hence, an effective way to cut off noise from the engine is to form the wall, through which sound waves are expected to pass, in a laminated structure in which a solid, a gas and a solid are stacked in that order; to cover the wall surface with a heavy material such as lead; or to form the wall in a laminated structure in which a space between the wall surfaces is evacuated to prevent propagation of sound waves.

SUMMARY OF THE INVENTION

Considering the above, the object of the present invention is to provide a vibration and sound isolation device for a cogeneration system (electric power supply system) with an engine, designed to prevent emission of noise and vibrations from the engine operating on a low-quality fuel such as heavy oil and rotating at high speed in a system such as a cogeneration system. Such a vibration and sound isolation device is characterized by a simple, inexpensive vibration isolation structure in which a truck comprising tires and a mounting table mounting an engine and a generator, both constitutional elements of the power supply system, is supported on a base to eliminate the cause of vibrations and noise generated by the power supply system and prevent transmission of vibrations to the structure. The vibration and sound isolation device is also characterized in that the truck can be moved to a specified location and held on the base at that location stably enough to eliminate a risk of the truck being shifted even during earthquakes.

This invention relates to a vibration and sound isolation device for a cogeneration system (an electlic power supply system), which comprises: a mounting table placed on a base and mounting an engine and a generator connected to an output shaft of the engine; main tires filled with air and supported on rotating shafts on the mounting table to support the mounting table so that the mounting table can travel; subtires filled with air and mounted to the mounting table so that they project from both sides of the mounting table in the direction of its width; and support members secured to the base and engaging the main tires and the subtires to hold the mounting table through the main tires and the subtires to the base.

The base laid at a location where the truck is to be installed has a rubber sheet whose frequency characteristic differs from those of the main tires and subtires. Hence, it is possible to absorb large vibrations with the rubber sheet of the base and small vibrations with the main tires and subtires, allowing the device to work as a double vibration absorbing device, effectively absorbing vibrations of the power supply system.

The support members with which the subtires engage include a support body secured to the base, a sub-rubber sheet secured to the support body, and an engagement body secured to the sub-rubber sheet. The sub-rubber sheet has a frequency characteristic different from that of the subtires.

The air pressures of the main tires and subtires can be adjusted properly to prevent vibrations of the engine from being transmitted to the outside. Thus, it is possible to eliminate clearances between the truck which mounts the power supply system through the main tires and subtires with properly adjusted air pressures and the base or support members and thereby firmly hold the truck immovable, preventing the vibrations and noise of the power supply system from being transferred to the structure at the installation site through the main tires and subtires.

Another object of this invention is to provide a vibration and sound isolation device for a cogeneration system (electric power supply system), in which the installation chamber formed by the multilayer wall bodies that enclose the power supply system in all directions is made a sound isolation structure, with only things coming out from the installation chamber limited to lead wires, thus preventing generation of vibrations and noise.

This invention also relates to a vibration and sound isolation device for a cogeneration system which comprises: a truck including a mounting table and tires filled with air, the tires being attached to rotating shafts on the mounting table to support the mounting table so that it can travel; a power supply system comprising an engine and a generator connected to an out put of the engine, both mounted on the mounting table; and an installation chamber formed by a base mounting the truck and multilayer wall bodies enclosingly accommodating the truck mounting the power supply system and the base; wherein the multilayer wall bodies each comprise a hollow metal housing having its front and back joined together by an elastic material, a rubber covering layer secured to an inner surface of the metal housing and a corrugated support member incorporated in the metal housing.

The rubber covering layer is a composite sound absorbing material of a rubber material and a fiber material to prevent transmission of vibrations to the inner surfaces of the metal housings. The hollow portions in the metal housings in the multilayer wall bodies are evacuated.

In the joint portions connecting the ends of the multilayer wall bodies, rubber packings having a hollow portion filled with air are brought into intimate contact with the outer surfaces of the connected ends of the metal housings, and metal angle support members are arranged on both sides of the connected ends so as to cover the rubber packings and are fixed together along with the metal housings. The hollow portions in the rubber packings are filled with air. When the rubber packings deflate as the air leaks, the hollow portions need only to be refilled with air.

The base laid in the installation chamber has a rubber sheet whose frequency characteristic differs from that of the tires. Transmission to the outside of vibrations and noise of the engine can be suppressed by properly adjusting the air pressures of the tires. When the air pressures of the tires decrease, they need only to be refilled with air to appropriate pressures.

Noise generated by the engine includes radiation sound in the form of air vibrations and engine vibrations transmitted as air vibrations. These vibrations resonate with the structure, emitting noise from the inside to the outside of the structure.

With the vibration and sound isolation device of this invention, however, the vibrations and noise generated by the engine can be absorbed by the installation chamber and the tires, preventing the transmission of engine vibrations and noise from the installation chamber to the outside.

In this vibration and sound isolation device, the installation chamber is formed by the multilayer wall bodies, which incorporate a corrugated support member, a shape maintaining structure, in the metal housings and also arrange on the inner wall surfaces of the metal housings a rubber covering layer made of a sound absorbing material with a number of fibrous projections. When the vacuum level inside lowers, the air needs to be evacuated to create a vacuum.

Because the mounting table on which the engine is mounted is supported on the base by the main tires and subtires filled with air, vibrations generated by the engine can be absorbed by the main tires and subtires, preventing engine vibrations from being transferred from the equipment itself to the outside.

The mounting table can travel on the main tires. Once the installation site is determined, in a factory, at the roof of a building, in a building or at any appropriate locations, the base is laid at that installation site and then the mounting table is carried or moved onto the base where it is firmly installed.

The upper parts of the main tires are locked in the recessed portions formed in the support members elastically secured to the base in order to prevent the mounting table from being shifted in a longitudinal direction due to vibrations of the engine. Further, to prevent the mounting table from being shifted in the width direction on the base due to vibrations of the engine, the subtires are placed in contact with the support members secured to the base, thereby fixing the mounting table to the base.

Hence, if the power supply system is installed, for example, on the roof of a building or near the side wall of a building, it will not release vibrations to the surrounding. Because the truck on which the power supply system is mounted can be firmly fixed at the selected installation site, there is no risk of the truck being dislocated even in the event of an earthquake. Further, because the mounting table can be moved by using the main tires, it is easy to move the power supply system to the installation site and firmly install it there.

The vibration and sound isolation device for a cogeneration system of this invention absorbs vibrations generated by the engine with the tires and the rubber sheet of the base and noise from the engine with the multilayer wall bodies of sound absorbing structure, thus preventing noise and vibrations from being transmitted from the installation chamber to the outer surroundings. Furthermore, the truck can be moved using the tires to the selected installation site for the cogeneration system (power supply system).

Because this vibration and sound isolation device can prevent dissipation of noise and vibrations, it can be operated without causing environmental problems even when it is installed on the roof of a building or near the side wall of a building. Since the multilayer wall bodies defining the installation chamber have a heat insulating effect, not only can they prevent the interior of the installation chamber from being heated excessively by external heat, as from sun light, but they can also eliminate the problem of heating of the outer wall of the multilayer wall bodies due to heat from the engine of the power supply system. Further, the exhaust gas energy from the engine may also be recovered by the turbocharger or energy recovery device for hot water heating, which also contributes to keeping the installation chamber from becoming abnormally hot.

DETAILED DESCRIPTION OF THE EMBODIMENT

By referring to the accompanying drawings, embodiments of the vibration and sound isolation device of this invention for a cogeneration system equipped with an engine will be described.

The vibration and sound isolation device of this invention may be applied to a power supply system such as a fixed installation type cogeneration system that produces electricity and hot water by using an engine 1, for example, a diesel engine (as disclosed in Japanese Patent Application Nos. 151910/1996 and 151911/1996 filed by this applicant) capable of high revolution using a low-quality fuel such as heavy oil. The engine 1 operates by repeating, for instance, four predetermined strokes of intake, compression, power and exhaust.

Figure 1:
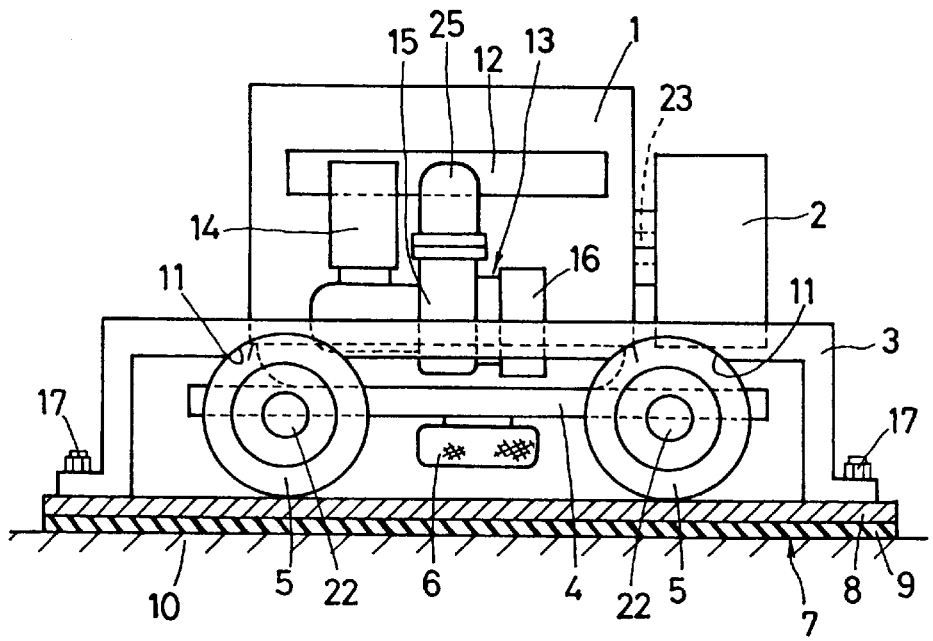
FIG. 1 is a front view of the vibration and sound isolation device for a cogeneration system equipped with an engine, as the first embodiment of this invention.
Figure 2:
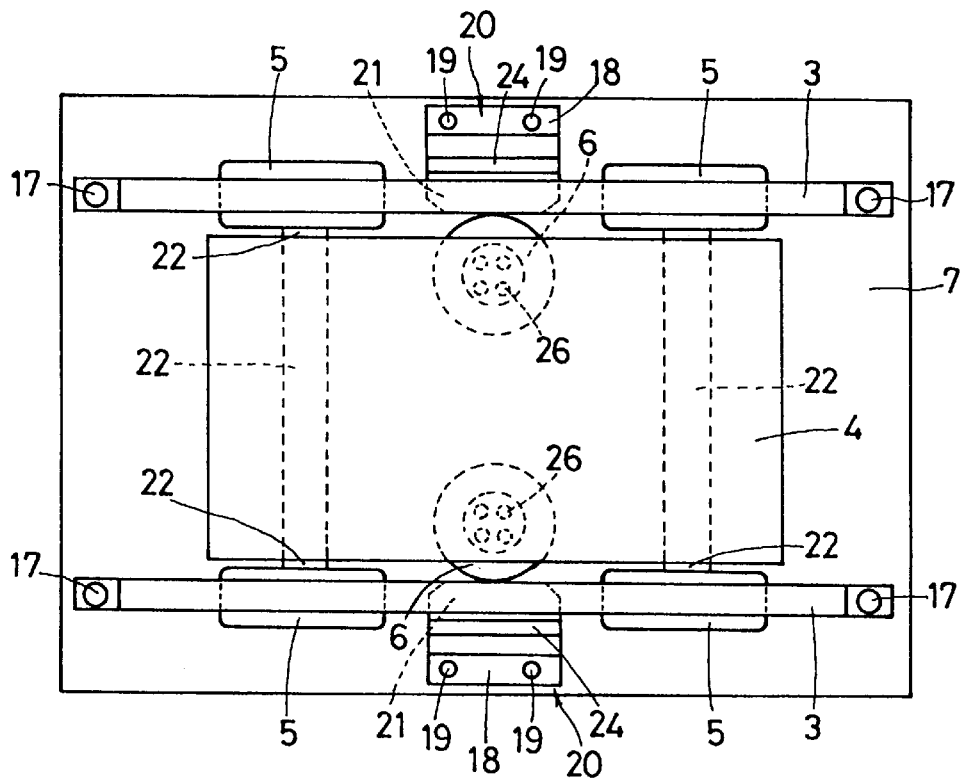
FIG. 2 is a plan view of the vibration and sound isolation device of FIG. 1 for a cogeneration system equipped with an engine.

First, let us turn to FIG. 1 and FIG. 2 and describe the first embodiment of the vibration and sound isolation device for an engine-driven power supply system.

The engine 1 in the first embodiment comprises, for example, a cylinder block, a cylinder head secured to the cylinder block, cylinder liners fitted in bores in the cylinder block to form cylinders, and pistons reciprocating in the cylinders. In the engine 1, an exhaust gas is discharged through an exhaust manifold 12. An exhaust pipe 25 connected to the exhaust manifold 12 is connected with a turbocharger 13 that comprises a turbine 15 for recovering the exhaust gas energy and a compressor 16 for supercharging. Downstream of the turbine 15 of the turbocharger 13 is provided an energy recovering device 14 that recovers the exhaust gas energy for producing thermal energy and hot water. An output shaft 23 of the engine 1 is connected with a generator 2 that generates an electric energy. In this embodiment, the engine 1 and the generator 2 combine to form a cogeneration system.

The first embodiment suppresses vibrations generated by the above cogeneration system and has the engine 1 and the generator 2 installed on a mounting table 4 of a truck. The mounting table 4 is supported through main tires 5 on a base 7 laid at an installation site 10 on a floor or ground in a factory, on a roof of a building, or in or near a building. The base 7 comprises a rubber sheet 9 installed at the installation site 10 and a support plate 8, such as an iron plate, secured to the installation site 10 through the rubber sheet 9.

The first embodiment comprises main tires 5 filled with air and supported on rotating shafts 22 on the mounting table 4 to allow the mounting table 4 to travel; subtires 6 filled with air and fixed to the underside of the mounting table 4 by bolts 26 in such a way that they project from both sides in the width direction of the mounting table 4; support members 3 that hold the mounting table 4 through the main tires 5 to the base 7 by anchor bolts 17; and support members 20 secured to the base 7 by anchor bolts 19 on both sides of the mounting table 4 and having engagement members 21 engageable with the subtires 6.

The upper parts of the main tires 5 are locked in recessed portions 11 of the support members 3 secured to the base 7 to elastically support the mounting table 4 to the base 7 through the main tires 5 so that the mounting table 4 will not move on the base 7 in the longitudinal direction when the engine 1 is running. To prevent the mounting table 4 from moving on the base 7 in the width direction when the engine 1 is running, the subtires 6 are brought into contact with the engagement members 21 of the support members 20 secured to the base 7 to resiliently hold the mounting table 4 through the subtires 6 in the width direction with respect to the base 7. The support members 20 each comprise a support body 18 secured to the base 7 through the anchor bolts 19 and an engagement member 21 fixed to the support body 18 through a sub-rubber sheet 24. The sub-rubber sheet 24 is made of a material whose frequency characteristic differs from that of the subtire 6.

The rubber sheet 9 making up the base 7 laid on the installation site 10 is made of a rubber material different in frequency characteristic from the main tires 5 and the subtires 6. The main tires 5 and the subtires 6 can be properly regulated in their air pressure so as to eliminate the vertical and lateral clearances between the mounting table 4 and the main and sub tires 5, 6 and thereby elastically support the mounting table 4. This effectively prevents the vibrations of the engine 1 from being transmitted to the outside.

Figure 3:
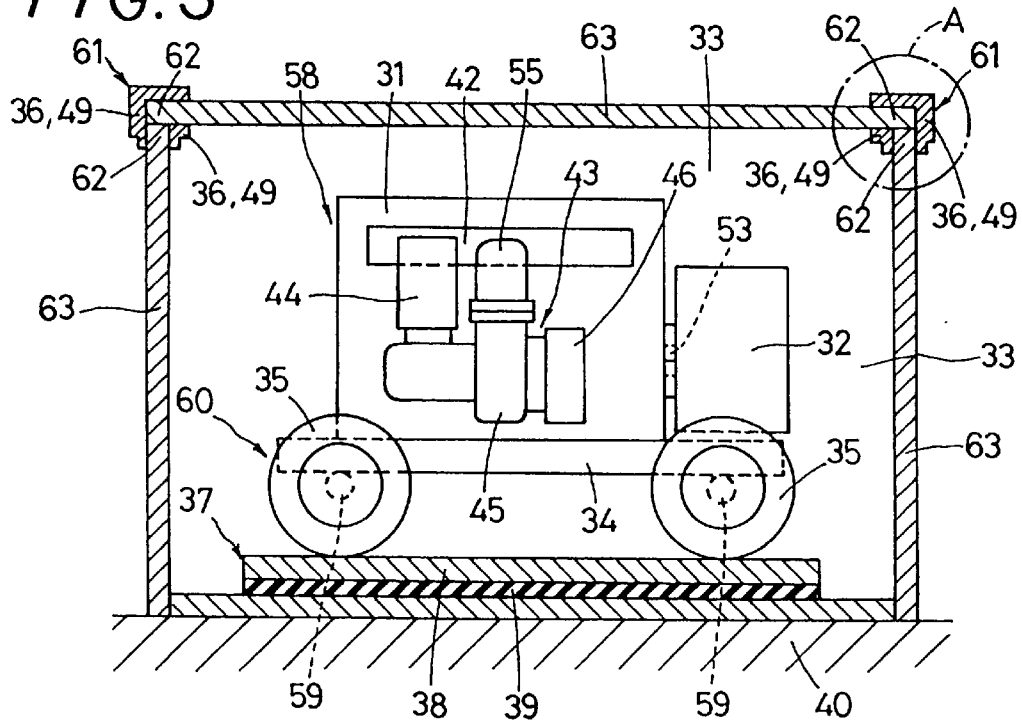
FIG. 3 is a front view of the vibration and sound isolation device for a cogeneration system equipped with an engine, as the second embodiment of this invention.
Figure 4:
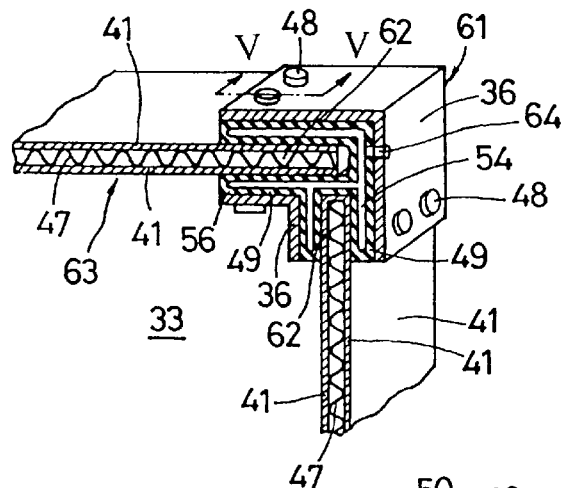
FIG. 4 is an enlarged perspective view of a part denoted A of FIG. 3.
Figure 5:
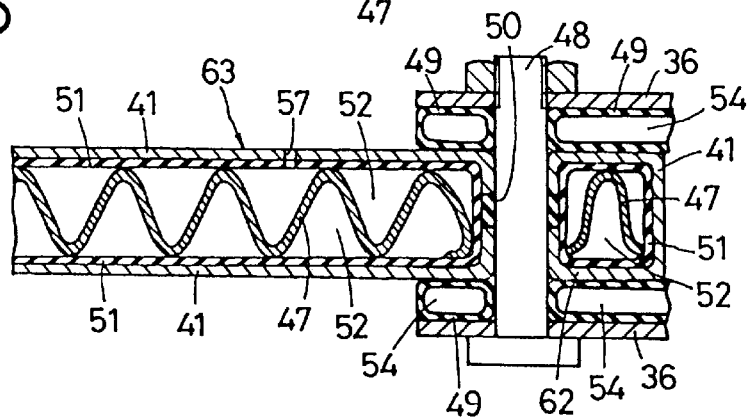
FIG. 5 is an enlarged cross section taken along the line B—B of FIG. 4.

Next, by referring to FIG. 3, 4 and 5, the second embodiment of the vibration and sound isolation device of this invention for a cogeneration system (electric power supply system) with the engine 1.

Like the first embodiment, the second embodiment has a diesel engine 31 and a generator 32 to form the cogeneration system. The exhaust gas from the diesel engine 31 is discharged through an exhaust manifold 42. An exhaust pipe 55 connected to the exhaust manifold 42 is connected with a turbocharger 43, which comprises a turbine 45 for recovering an exhaust gas energy and a compressor 46 for supercharging. Downstream of the turbine 45 of the turbocharger 43 is installed an energy recovery device 44 that recovers the exhaust gas energy for producing thermal energy and hot water. An output shaft 53 of the diesel engine 31 is coupled with a generator 32 that produces electric energy.

In the second embodiment, because sound waves from the engine installed in a narrow enclosed space are reflected by wall surfaces of the enclosed space and may be amplified by resonance producing complex vibrations, the second embodiment has the inner wall surface side of the wall body (metal housing 41)—which forms an installation chamber 33—kept in a vacuum state so that the sound waves will not be transmitted. The wall body is formed into a multilayer wall body 63 that includes a composite sound absorbing material of a fiber and a rubber (for instance, a rubber covering layer 51) having a function of maintaining the vacuum for long periods and a sound absorbing function. This sound isolation device for a power supply system is designed to suppress noise and vibrations generated by the engine 31 in the cogeneration system. The engine 31 and the generator 32 are mounted on a mounting table 34 of a truck. The mounting table 34 is supported through main tires 35 on a base 37 laid at an installation site 40 on a floor or ground in a factory, on a roof of a building or in or near a building. The base 37 comprises a rubber sheet 39 installed at the installation site 40 and a support plate 38, such as an iron plate, secured to the installation site 40 through the rubber sheet 39.

The second embodiment includes a truck 60 having tires 35 filled with air and supported on rotating shafts 59 on the mounting table 34 to support the mounting table 34 so that it can travel; a power supply system 58 having the engine 31 mounted on the mounting table 34 and the generator 32 connected to the output shaft 53 of the engine 31; and an installation chamber 33 formed by the base 37 on which the truck 60 is mounted and by the multilayer wall body 63 that enclosingly accommodates the truck 60 mounting the power supply system 58 and the base 37.

The truck 60, when mounted on the base 37, can be fixed by the support members that are secured to the base 37 by anchor bolts. The multilayer wall body 63 comprises a hollow metal housing 41, a rubber covering layer 51 fixed to the inner surface of the metal housing 41, and a corrugated support member 47 incorporated in the metal housing 41.

The hollow metal housing 41 may, for example, be formed of a plate such as an iron plate and an aluminum alloy plate. The rubber sheet 39 of the base 37 laid inside the installation chamber 33 is made of a rubber material whose frequency characteristic differs from that of the tires 35. The air pressure of the tires 35 can be regulated properly to eliminate clearances between the mounting table 34 and the tires 35 and thereby elastically support the mounting table 34, effectively preventing vibrations of the engine 31 from propagating to the outside.

In the second embodiment, a rubber covering layer 51 similar to the one described above is installed inside a hollow portion 52 in the metal housing 41 of the multilayer wall body 63. The hollow portion 52 is kept in a vacuum state. A vacuum can be created in the hollow portion 52 of the multilayer wall body 63 by drawing out air from an air vent hole 57 piercing through the metal housing 41 and the rubber covering layer 51 and then sealing the air vent hole 57 with a rubber material. Because the multilayer wall body 63 has a vacuum therein, oscillatory waves and sound waves can be prevented from passing through the multilayer wall body 63. In other words, it is possible to eliminate or attenuate the noise emitted from the installation chamber 33 to the outside.

A joint portion 61 connecting ends 62 of the metal housings 41 of the multilayer wall bodies 63 has rubber packing 49 fitted to the ends 62 so that they hold the ends 62 of the multilayer wall bodies 63 between them. On the outside of the rubber packing 49 are arranged metal angle support members 36 that are secured to the multilayer wall bodies 63 by bolts 48 passing through bolt holes 50. The rubber packing 49 has a hollow portion 54 to be filled with air. Air is filled into the hollow portion 54 of the rubber packing 49 by supplying air through an air filling port 64 piercing through the rubber packing 49 and the metal angle support member 36 and then closing the air filling port 64. As the hollow portion 54 of the rubber packing 49 is filled with air, the rubber packing 49 inflates pressing against the surfaces of the multilayer wall bodies 63 and the metal angle support members 36, firmly fixing the ends 62 of the multilayer wall bodies 63 together.

The metal angle support members 36 are fitted closely to the rubber packing 49 on both sides of the connected ends 62 of the hollow metal housings 41 so that the metal angle support members 36 cover the rubber packing 49. The metal angle support members 36 are secured together along with the hollow metal housing 41 by the bolts 48. Because the rubber packing 49 is interposed between the ends 62 of the hollow metal housing 41 at the joint portion 61 and firmly fixed and because the hollow portion 54 of the rubber packing 49 is filled with air, transmission of oscillatory waves through the joint portion 61 can be prevented or attenuated.

What is claimed is:

1. A vibration and sound isolation device for a cogeneration system with an engine, comprising:

a mounting table placed on a base and mounting an engine and a generator connected to an output shaft of the engine;

main tires filled with air and supported on rotating shafts on the mounting table to support the mounting table so that the mounting table can travel;

subtires filled with air and mounted to the mounting table so that they project from both sides of the mounting table in the direction of its width; and support members secured to the base and engaging the main tires and the subtires to hold the mounting table through the main tires and the subtires to the base.

2. A vibration and sound isolation device for a cogeneration system with an engine according to claim 1, wherein the main tires are locked in recessed portions formed in the support members to elastically support the mounting table on the base and thereby prevent the mounting table from moving in a longitudinal direction on the base when the mounting table is mounted on the base.

3. A vibration and sound isolation device for a cogeneration system with an engine according to claim 1, wherein the subtires engage engagement bodies of the support members to elastically support the mounting table on the base in its width direction and thereby prevent the mounting table from moving in the width direction on the base when the mounting table is mounted on the base.

4. A vibration and sound isolation device for a cogeneration system with an engine according to claim 1, wherein the base laid on an installation site has a rubber sheets whose frequency characteristics differ from those of the main tires and the subtires.

5. A vibration and sound isolation device for a cogeneration system with an engine according to claim 1, wherein the support members which the subtires engage comprise support bodies secured to the base, sub-rubber sheets secured to the support bodies and engagement bodies secured to the sub-rubber sheets, and the sub-rubber sheets have frequency characteristics different from that of the subtires.

6. A vibration and sound isolation device for an engine-driven power supply system according to claim 1, wherein air pressures of the main tires and the subtires can be properly regulated to prevent vibration of the engine from being transmitted to the outside.

7. A vibration and sound isolation device for a cogeneration system with an engine, comprising:

a truck including a mounting table and tires filled with air, the tires being attached to rotating shafts on the mounting table to support the mounting table so that it can travel;

a power supply system comprising an engine and a generator connected to an output of the engine, both mounted on the mounting table; and an installation chamber formed by a base mounting the truck and multilayer wall bodies enclosingly accommodating the truck mounting the power supply system and the base;

wherein the multilayer wall bodies each comprise a hollow metal housing, a rubber covering layer secured to an inner surface of the metal housing and a corrugated support member incorporated in the metal housing.

8. A vibration and sound isolation device for a cogeneration system with an engine according to claim 7, wherein the rubber covering layer is a composite sound absorbing material of a rubber and a fiber as organic and inorganic materials to prevent transmission of vibrations to the inner surface of the metal housing.

9. A vibration and sound isolation device for a cogeneration system with an engine according to claim 7, wherein the hollow portions in the metal housings of the multilayer wall bodies are kept in a vacuum state.

10. A vibration and sound isolation device for a cogeneration system with an engine according to claim 7, wherein in connecting portions of the multilayer wall bodies, rubber packings having hollow portions filled with air are brought into intimate contact with outer surfaces of connected end portions of the metal housings, metal angle support members are arranged on both inner and outer sides of the connected end portions so that the metal angle support members cover the rubber packings, and the metal angle support members are fixed together along with the metal housings without the metal angle support members directly contacting each other.

11. A vibration and sound isolation device for a cogeneration system with an engine according to claim 7, wherein the base laid in the installation chamber has rubber sheets whose frequency characteristics are different from that of the tires.

12. A vibration and sound isolation device for a cogeneration system with an engine according to claim 7, wherein air pressures of the tires can be regulated properly to prevent vibration of the engine from being transmitted to the outside.

13. A vibration and sound isolation device for a cogeneration system with an engine according to claim 7, wherein a rubber of the tires is made by combining a material with a large modulus of elasticity and a fiber material with a small modulus of elasticity.

\* \* \* \* \*

UNITED STATES PATENT AND TRADEMARK OFFICE
CERTIFICATE OF CORRECTION

PATENT NO.   : 5,881,990
DATED        : Mar. 16, 1999
INVENTOR(S)  : Hideo Kawamura It is certified that error appears in the above-indentified patent and that said Letters Patent is hereby corrected as shown below:

Column 5, numbered line 55, change "B-B" to "V-V".

Signed and Sealed this

Thirty-first Day of August, 1999

Attest:

Q. TODD DICKINSON

*Attesting Officer*            *Acting Commissioner of Patents and Trademarks*